United States Patent [19]

Kawasaki et al.

[11] Patent Number: 4,841,322
[45] Date of Patent: Jun. 20, 1989

[54] CAMERA HAVING INTERCHANGEABLE LENSES

[75] Inventors: Masahiro Kawasaki; Osamu Sato, both of Tokyo, Japan

[73] Assignee: Asahi Kogaku Kogyo Kabushiki Kaisha, Tokyo, Japan

[21] Appl. No.: 266,328

[22] Filed: Nov. 1, 1988

Related U.S. Application Data

[63] Continuation of Ser. No. 103,311, Oct. 1, 1987, abandoned.

[30] Foreign Application Priority Data

Oct. 1, 1986 [JP] Japan .................... 61-234141
Nov. 10, 1986 [JP] Japan .................... 61-265738
Feb. 6, 1987 [JP] Japan .................... 62-15509[U]

[51] Int. Cl.$^4$ .............................. G03B 3/10; G03B 7/20
[52] U.S. Cl. .................................... 354/400; 354/286
[58] Field of Search ........................... 354/286, 400

[56] References Cited

U.S. PATENT DOCUMENTS 4,437,752 3/1984 Akashi et al. ............... 354/286 X
4,464,034 8/1984 Tomino ........................... 354/286
4,477,164 10/1984 Nakai et al. ................ 354/286 X
4,541,700 9/1985 Bletz et al. ................ 354/286 X
4,572,638 2/1986 Nakai et al. ................... 354/286

FOREIGN PATENT DOCUMENTS 3407304 9/1984 Fed. Rep. of Germany .

Primary Examiner—Michael L. Gellner
Attorney, Agent, or Firm—Sughrue, Mion, Zinn, Macpeak & Seas

[57] ABSTRACT

A camera and interchangeable lenses for such camera in which it is automatically detected whether or not the lens mounted on the camera has an automatic focusing capability. If it does, respective sets of electrical contacts provided on the lens and camera body are employed to transmit and receive a series of different data between the camera body and the lens. If it does not, the only a single datum is transmitted, for example, an open lens-stop value of the lens, is transmitted over the two sets of contacts. An automatic focusing actuation voltage applied from the camera body can be sensed to determine whether or not the lens has the automatic focusing capability.

23 Claims, 9 Drawing Sheets

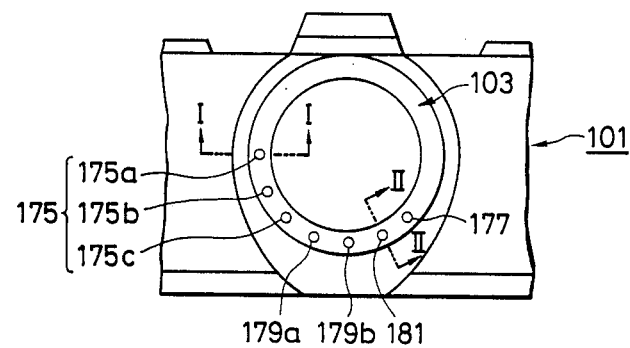
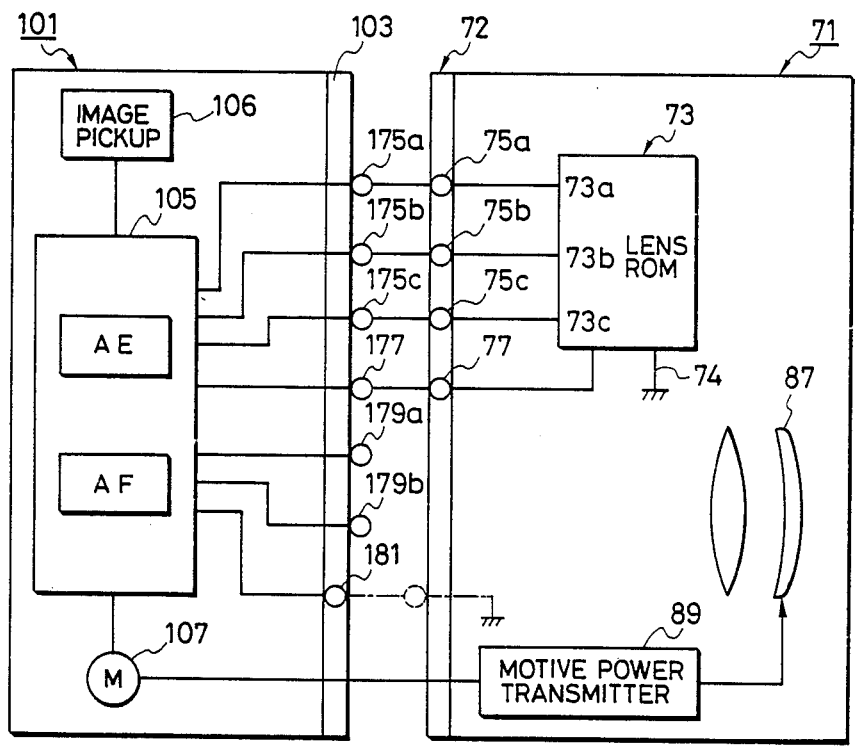

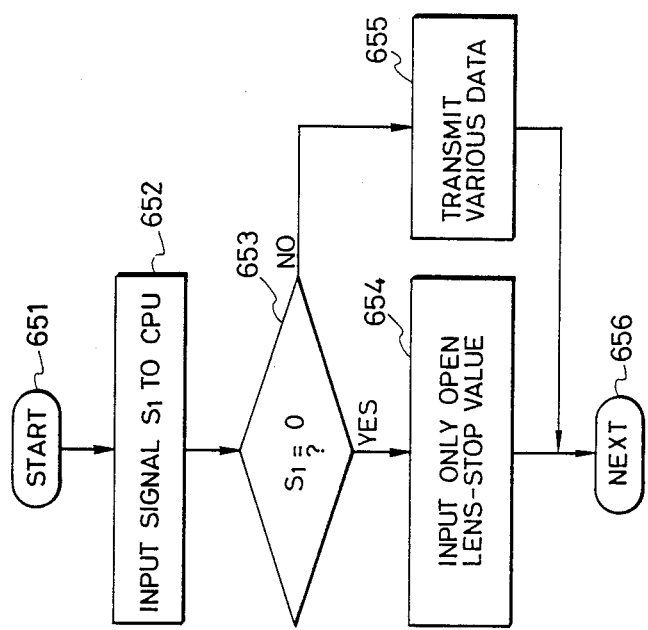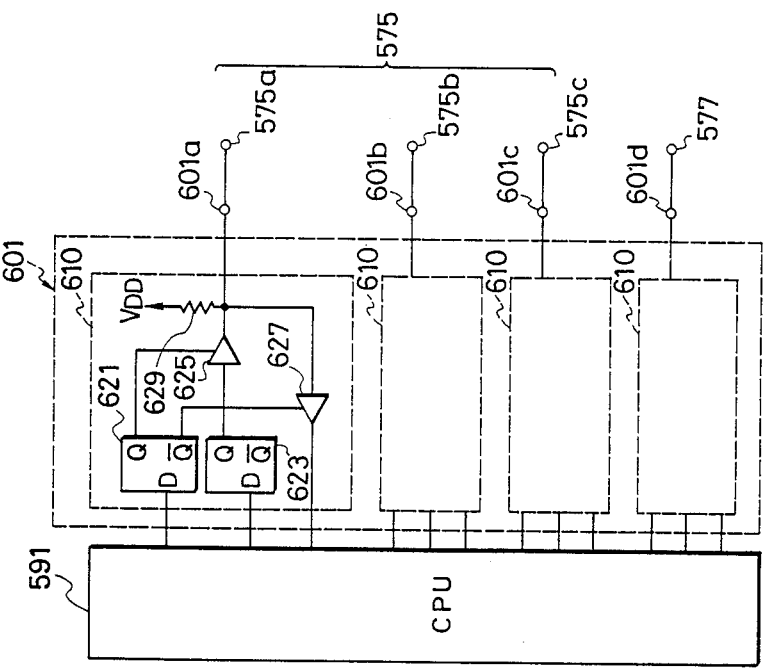

CAMERA HAVING INTERCHANGEABLE LENSES

This is a continuation of application Ser. No. 103,311, filed Oct. 1, 1987 now abandoned.

BACKGROUND OF THE INVENTION

The present invention relates to a photographing camera capable of being used with a plurality of types of interchangeable lens systems (lens-interchangeable camera) and to a photographing lens for the photographing camera.

Generally, a lens-interchangeable camera has an AE (automatic exposure) capability. For execution of such AE, data of lens characteristic values such as an open lens-stop value (full opened diaphragm value) and a minimum lens-stop value (full-closed diapharagm value) for each photographic lens and data for change-over between automatic exposure control mode and manual exposure control mode must be transmitted to the camera body. Accordingly, data-transmission electrical contracts are provided both on the camera body and on the photographic lens so as to be connected in a predetermined relation.

An example of such data-transmission electrical contacts, as disclosed in Japanese Patent Unexamined Publication No. 162531/1984 filed by the present Applicant is shown in FIGS. 1 through 4.

The design of aforementioned electrical contacts takes into account the fact that the AF body 101 is designed to receive lenses having an AF capability as well as conventional photographing lenses which have no AF capability.

A photographing lens having an AF capability and capable of being mounted on the AF body 101 is described in Japanese Patent Application Publication No. 234141/1986, also filed by the present applicant. This photographing lens is also designed to be usable with conventional camera bodies which have no AF capability, based on the same design philosophy as described above for the AF body.

For camera users who use only the AF body 101, it is, however, unnecessary for photographing lenses to be usable with other camera bodies. Such photographing lenses are provided as exclusive parts. By providing these photographing lenses as exclusive parts, the cost of the lenses can be reduced.

In view of the aforementioned circumstances, it is therefore an object of the present invention to provide a photographing lens suitable for attachment to an AF body which has a reduced cost.

In FIGS. 1 to 4, reference numeral 211 designates a camera body, 213 a mount of the camera body, 215 a photographing lens, and 217 a mount of the photographing lens.

Each of the mounts 213 and 217 is also made of an electrically conductive material, for example, a material prepared by applying a plating treatment or the like to brass. Each of the mounts 213 and 217 serves as a connector between the camera body 211 and the photographing lens 215 and as an electrical ground.

The mount 213 of the camera body 211 is provided with an electrical contact group 227, for example, a group composed of five electrical contacts 221a, 222a, 223a, 224a and 225a electrically insulated from the mount 213 and arranged so as to be projectable from the surface of the mount 213.

The aforementioned electrical contacts are provided on the mount 213 and 217 in the manner to now be described.

FIG. 1 is a front view showing the camera body 101 seen from the mount. FIG. 2 is a rear view of a lens used with the camera body shown in FIG. 1. FIG. 3 is a schematic sectional view taken along a line I—I in FIG. 1 showing the electrical contact 221a. Similarly, FIG. 4 is a schematic sectional view taken along a line II—II in FIG. 1 showing the electrical contact 231a.

Each of the electrical contacts designated by reference numerals 221a, 222b, 223c, 224, and 225b is electrically insulated from the mount 103 and is provided so as to be able to project from the surface of the mount. That is, as shown typically by the contact indicated by reference numeral 221a in FIG. 3, each of the electrical contacts is electrically insulated from the mount 213 by an insulating layer 18 and normally projects from the surface of the mount 213 (as shown by the solid line in FIG. 3). Further, each of the contacts is provided with a spring 19 which urges the contact against the mating contact when a photographing lens or rear converter is mounted to the camera body 211 (as shown by the broken line of FIG. 3).

The electrical contact designated by reference numeral 231a is electrically insulated from the mount 213 and provided so as to be unable to project from the surface of the mount (FIG. 4). The structure of the contacts 221a, 222a, 223a, 224a and 225a is as illustrated in FIG. 3.

The mount 217 of the photographing lens 215 is provided with an electrical contact group 229 corresponding to the electrical contact group 227. The electrical contact group 229 is composed of five electrical contacts 221b, 222b, 223b, 224b and 225b as shown in FIG. 2, which are not projectable from the surface of the mount 217 and which are electrically insulated from the mount 217. That is, the contacts 221b, 222b, 223b, 224b and 225b are constructed as illustrated in FIG. 4.

Further, the mount 213 of the camera body 211 is provided with another electrical contact 231a electrically insulated from the mount 213 and arranged so as to not project from the surface of the mount 213. That is, the structure is the same as that illustrated in FIG. 4. The mount 217 of the photographing lens 215 is also provided with an electrical contact 231b corresponding to the electrical contact 231a the electrical contact 231b being electrically insulated from the mount 217 and arranged so as to be able to project from the surface of the mount 217 as shown in FIG. 3.

When the aforementioned photographing lens 215 is mounted on the aforementioned camera body 211, respective data are transmitted as follows. The data of the open lens-stop value is transmitted through three pairs of contacts (221a, 221b), (222a, 222b) and (223a, 223b) included in the electrical contact groups 227 and 229. The data of the minimum lens-stop value is transmitted through two pairs of contacts (224a, 224b) and (225a, 225b) included in the electrical contact groups 227 and 229. The data for change-over between automatic exposure control mode and manual exposure control mode is transmitted through the electrical contact 231a (as described in detail later). For example, the data of lens characteristic values are transmitted as follows.

The contacts included in the lens-side electrical contact group 229 are pretreated corresponding to the type of the photographing lens such that some contacts are coated with an insulating material while others are not and are free to make electrical connections with corresponding contacts on the body-side mount. A voltage is supplied through body-side pull-up resistors so that the voltage level at each of the insulated contacts is raised and the voltage level at each of the other contacts connected to the mount (grounded contacts) is reduced. Thus, the data of lens characteristic values is obtained by the combination of such high and low signals generated corresponding to the respective data of lens-stop values.

The data for change-over between automatic exposure control mode and manual exposure control mode may be generated as follows. The lens-side electrical contact 231b is connected to the lens-side mount 217 (i.e, the contact 213b is grounded). When a stop ring incorporated in the photographing lens is set in a predetermined position, the lens-side contact 231b touches the body-side contact 231a. When the stop ring is rotated from the predetermined position, the lens-side electrical contact 231b is moved away from the body-side electrical contact 231a. Thus, the data for change-over between automatic exposure control mode and manual exposure control mode is obtained on the basis of two states, namely, whether or not the lens-side electrical contact 231b touches the body-side electrical contact 231a.

These data are inputted to the controller in the camera body.

Although the aforedescribed data-transmission electrical contacts are simple in construction, the data for lens characteristic values and the data for change-over between automatic exposure control mode and manual exposure control mode can be securely transmitted to the camera body.

A further example of a lens-interchangeable camera having an AF capability is disclosed in Japanese Patent Unexamined Publication No. 4916/1985. FIG. 5 is a diagram showing such a camera having such an AF capability.

The camera of this type has a mechanism for automatically moving a lens of the photographing lens group to the focused position. More exactly, the photographing lens 241 for the AF camera has a plurality of lens elements including a lens 243 movable for focusing, a motive power transmitting device 245 for moving the movable lens 243, and a ROM (read-only memory) 247 for storing information (called "lens characteristic data") such as data indicative of open or minimum lens-stop values of the photographing lens 241, data indicative of photographic conditions corresponding to the position of the lens while being moved for focusing, and the like.

On the other hand, the camera body 251 of the AF camera includes a controller 253 for effecting AE and AF operations, an actuator 55 for moving the lens of the photographing lens group to the focused position, and other necessary parts.

In the prior art, photographing lenses of a type provided with an AF capability have been designed to be used together with an exclusive camera body 251. Accordingly, various kinds of data necessary for AE and AF control must be transmitted through exclusive data-transmission electrical contacts 261.

For the benefit of the camera user, it is desired that expensive camera bodies and photographing lenses be interchangeable so that they need not be replaced by new products whenever new bodies or lenses appear on the market. However, in the prior art photographing lens having an AF mechanism, a problem exists in that the photographing lens is not interchangeable with both a camera body having an AE mechanism and a camera body having an AF capability.

In view of the aforementioned circumstances, it is therefore an object of the, present invention to provide a photographing camera high in usability.

Another object of the present invention in to provide a photographing lens suitable for attachment to an AF body which has a reduced cost.

The other object of the present invention is to provide a photographing lens which not only can be attached to a camera body having an AF capability, but also can be effectively used with a camera body having an AE capability.

SUMMARY OF THE INVENTION

To attain the first-mentioned object, the present invention provides a photographing lens having a lens system including an automatic focusing movable lens and a lens ROM for storing unique data of the lens system, the photographing lens being characterized in that it further comprises:

a lens-side mount adapted to be attached to a mount of a camera body;

a group of electrical contacts provided on the lens-side mount and respectively connected to different data terminals of the lens ROM; and a control electrical contact provided on the lens-side mount for supplying electric power from the side of the camera body to the lens ROM for driving the lens ROM.

In such an arrangement according to the present invention, not only can the lens ROM be driven by electric power supplied through the electric power supply electrical contact, but also data transmission can be made between the camera body and the lens ROM through the group of electrical contacts.

Further, the present invention provides a photographing lens which comprises: a lens ROM for feeding lens characteristic data to a camera body to take a photograph in either the AE or AF mode; a group of electrical contacts respectively connected to different data terminals of the lens ROM and provided in a photographing lens mount; a control electrical contact provided in the mount to control the lens ROM; and change-over means for changing over the group of electrical contacts between a first state where the group of electrical contacts are exclusively used to transmit different data, such as for example reset signal, clock signal and serial data from the lens ROM, and a second state where the group of electrical contacts are all used to transmit one datum, for example, the open lens-stop value of the photographing lens, with the state being determined in accordance with voltage on the control electrical contact.

Preferably, the control electrical contact is provided on the mount so as to be able to project from the surface of the mount.

Also, the change-over means is preferably constituted by a group of electrical switches provided between the control contact and each of the group of electrical contacts.

The change-over means is preferably incorporated in the lens ROM.

In the arrangement according to the present invention, when the lens ROM control electrical contact is at the voltage where the lens ROM is actuated, the aforementioned change-over means acts on the electrical contact group connected to the lens ROM so that, for example, one contact of the electrical contact group is connected to a reset signal input terminal to transmit a reset signal from the camera body to the lens ROM, another contact is connected to a clock signal input terminal, and a further contact is connected to a lens characteristic data output terminal to transmit lens characteristic data from the lens ROM to the camera body.

On the other hand, when the lens ROM control electrical contact is not at the voltage where the lens ROM is actuated, the change-over means connects the electrical contact groups, to transmit only one datum, such as the open lens-stop value data of the photographing lens.

To further attain the above and other objects, the camera body according to the present invention is provided with a mount to which a mount of a photographing lens is to be fitted, and is characterized in that it further comprises: an electrical contact provided on the body-side mount for determining whether the photographing lens has an automatic focusing capability or not, and a group of electrical contacts provided on the body-side mount for transmitting different data in the case where the photographing lens has an automatic focusing capability and for transmitting only one datum in the case where the photographing lens has no automatic focusing capability.

It is preferable that a voltage for driving the automatic focusing device of the photographing lens be applied from the camera body to the photographing lens through the electrical contact for indicating whether or not the photographing lens has an automatic focusing capability.

Moreover, it is preferable that the group of electrical contacts and the electrical contact for indicating whether the photographing lens has an automatic focusing capability or not be provided on the body-side mount in such a manner to be able to project from the surface of the body-side mount.

In such an arrangement according to the present invention, when the photographing lens is mounted on the camera body, whether the photographing lens has an automatic focusing capability or not can be automatically determined. Further, necessary data can be transmitted through the group of electrical contacts corresponding to the two cases as to whether the photographing lens has an automatic focusing capability or not.

It is assumed that a voltage for driving the automatic focusing device of the photographing lens is applied from the camera body to the photographing lens through the electrical contact for indicating whether the photographing lens has an automatic focusing capability. In the case of the aforementioned construction and when a photographing lens having an automatic focusing capability suitable for the camera body has been mounted on the camera body, a predetermined voltage is fed to the photographing lens through the electrical contact so that the voltage at the electrical contact assumes a predetermined value. On the contrary, if a photographing lens having no automatic focusing capability has been mounted on the camera body, no such predetermined voltage is applied to the photographing lens, and hence the voltage at the electrical contact has a value different from the predetermined value. Accordingly, whether the photographing lens mounted on the camera body has an automatic focusing capability or not can be judged by controlling the voltage at the electrical contact. Further, the function of the electrical contact group can be changed by sensing the voltage on the above contact.

BRIEF DESCRIPTION OF THE DRAWINGS

FIG. 7 shows a front view of a camera body having an AF capability according to the present invention;

FIG. 8 is a schematic block diagram showing the lens of FIG. 6 electrically coupled to a camera body;

FIG. 16A is a block schematic diagram of a controller of the invention;

FIG. 16B is a flowchart used to explain the operation of the controller of FIG. 16A.

DESCRIPTION OF THE PREFERRED EMBODIMENTS

Figure 3:
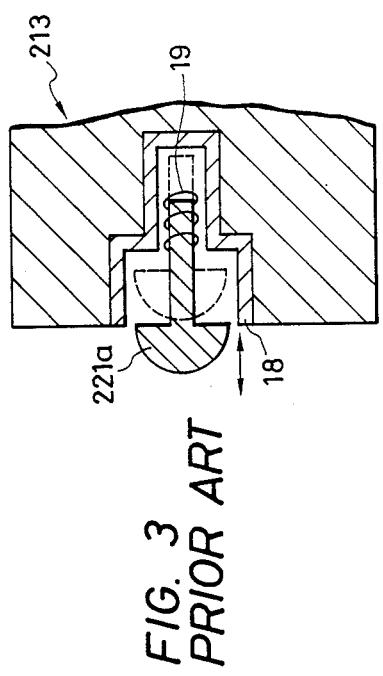
FIGS. 3 and 4 are sectional views showing data transmission electrical contacts used in both the prior art and the invention.

A first embodiment of the present invention will be described in detail with reference to the drawings. These drawings are for the purpose of mere illustration and not of limitation. All parts ordinarily provided in the camera body or photographing lens may be not shown in the drawings. It is therefore to be understood that various changes in the size, shape and arrangement of parts may be made without departing from the spirit of the invention. Like numerals in each of the drawings refer to like parts.

Figure 6A:
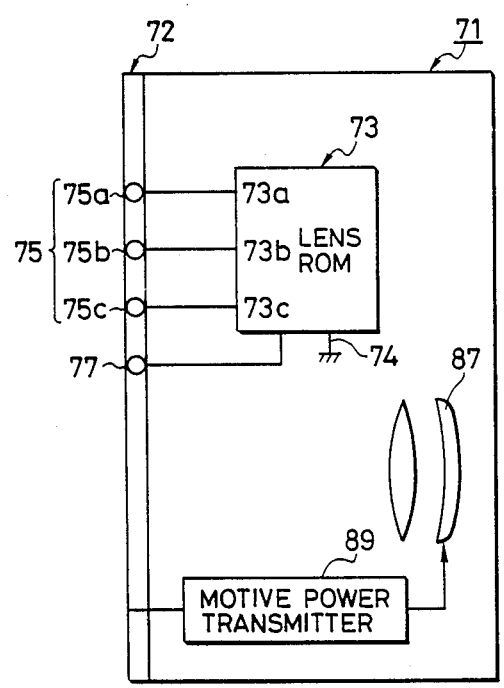
FIG. 6A is a schematic block diagram of a photographing lens constructed in accordance with a first embodiment of the invention.
Figure 6B:
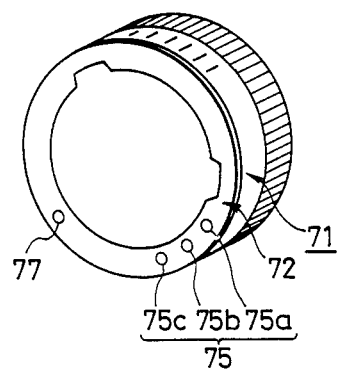
FIG. 6B shows a rear view of the lens of FIG. 6A.

An example of the construction of a photographing lens according to the present invention will be now described. FIG. 6A is a schematic block diagram showing the internal arrangement of an embodiment of a photographing lens according to the invention, and FIG. 6B is a schematic perspective view showing an example of the construction of the photographing lens according to the invention. FIG. 7 is a front view of a camera body having an AF capability according to the present invention. In these drawings, reference numeral 71 designates a photographing lens according to the invention.

In FIG. 6A, reference numeral 72 designates a mount provided on the photographing lens 71 (which hereinafter is sometimes referred to as "lens-side mount"). The lens-side mount 72 is used for mounting the photographing lens 71 onto another member such as a camera body 101 as shown in FIG. 7, a suitable rear converter, or the like, and the lens-side mount 72 corresponds to the body-side mount 213. The lens-side mount 72 is formed of a conductive material prepared by applying a plating treatment or the like to brass in the same manner as described above. with respect to the body-side mount 213. In this embodiment, the lens-side mount 72 functions as an electrical ground.

Reference numeral 73 designates a lens ROM. The lens ROM 73 stores lens characteristic data to make AE and AF operations possible. As described before, the lens characteristic data includes, for example, an open lens-stop value, a minimum lens-stop value, a coefficient for converting the amount of divergence of a movable lens from the focal point with respect to the subject into a quantity of length along which the movable lens is to be moved (as will be described later in more detail). If the photographing lens is a zoom lens, the lens characteristic data include open lens-stop values varying with zooming, quantities for shifting the, focal distance, and the like. Reference numeral 74 designates a ground terminal of the lens ROM 73. The ground terminal 74, for example, can be connected to the lens-side mount 72.

Reference numeral 75 designates a group of electrical contacts respectively connected to different terminals of the lens ROM 73 and serving to transmit data between the lens ROM and the camera body (as shown in FIG. 7). In this embodiment, the electrical contact group 75 is composed of three electrical contacts 75a, 75b and 75c corresponding to the electrical contact group 175 of the camera body 101.

Reference numeral 77 designates an electrical contact for supplying electric power from the camera body to the lens ROM 73 to drive the lens ROM 73 (the electrical contact 77 is hereinafter sometimes referred to as an "electrical source contact"). The electrical source contact 77 is connected to a predetermined terminal of the lens ROM 73. The electrical source contact 77 corresponds to a photographing lens identification electrical contact 177 of the camera body 101, whereby the lens ROM 73 is made operative when electric power is supplied through the identification electrical contact 177.

Figure 4:
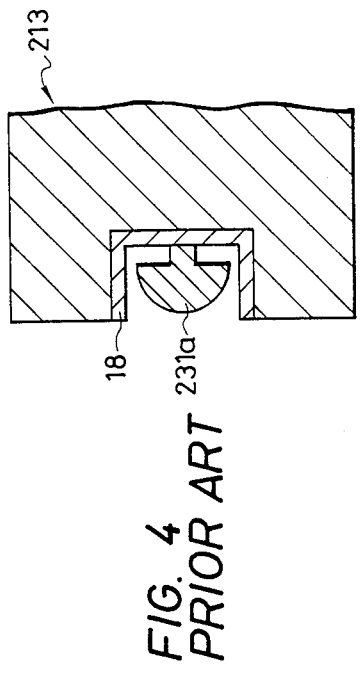

The electrical contacts 75a, 75b, 75c and 77 are respectively arranged so, as to touch the body-side electrical contacts 175a, 175b, 175c and 177 when the photographing lens 71 is mounted on the camera body 101 as described above with respect to FIG. 7. Preferably, the contacts 75a, 75b, 75c and 77 are electrically insulated from the lens-side mount 72 and constructed so as to not project from the surface of the mount 72 as described above with respect to FIG. 4. The concavo-convex shape of each of the electrical contacts provided on the mount is not limited in this embodiment and may be changed if necessary.

Further, the photographing lens 71 of the invention has a lens system including a lens 87 movable for focusing, and a motive power transmitting device 89 for transmitting motive power to the movable lens 87 from a driving motor provided on the camera body.

To better understand the photographing lens of the present invention, the operation of the lens 71 will be described briefly with reference to the case where the lens has been mounted on the AF body 101 described above with respect to FIG. 7.

FIG. 8 is a typical block diagram showing a camera composed of the photographing lens 71 of the present invention and the aforementioned AF body 101.

In such an arrangement, a voltage (for example +5 V) for driving the lens, ROM 73 is supplied from the controller 105 of the AF body 101 to the lens ROM 73 through the identification electrical contact 177 and the lens-side electric source contact 77.

While the lens ROM is being driven, data transmission necessary for photographing is made between the camera body 101 and the photographing lens 71. For example, the data transmission can be carried out in the following manner.

The reset signal from the controller 105 of the AF body 101 is applied to the lens ROM 73 through the electrical contacts 175a and 75a with a predetermined period. Further, the clock signal from the controller 105 of the AF body 101 is fed to the lens ROM 73 through the contacts 175b and 75b. The aforementioned lens characteristic data, such as the open lens-stop value, the minimum lens-stop value and the like are serially transmitted from the lens ROM 73 to the controller 105 through the contacts 75c and 175c in response to the reset signal and clock signal.

Further, a portion of the light from the subject transmitted through the photographing lens 71 is directed to the image pickup 106. In the controller 105, the amount of divergence of the focusing lens 87 from the focused position with respect to the subject is determined based on the data from the image pickup 106. Further, in the controller 105, the amount by which the lens 87 is to be moved is calculated in accordance with the amount of divergence from the focused position when the controller 105 judges that the subject is out of focus based on a comparison with a certain reference value. Accordingly, the movable lens 87 is moved as necessary by the driving motor 107. Further, with respect to automatic exposure, a conventional arrangement can be used.

According to the aforementioned construction, photographing in both AF and AE modes can be made.

The present invention is not limited to the aforementioned embodiment. That is, although in the aforementioned embodiment the contact group connected to the various data terminals of the lens ROM is composed of three electrical contacts, the number of electrical contacts constituting the contact group can be changed in accordance with the type and quantity of data to be transmitted.

Further, it is to be understood that the number of contacts provided on the mount is not limited to the number used in the aforementioned embodiment and can be increased if needed.

As described above, reference numeral 181 designates an electrical, contact provided on the camera body 101 for the purpose of detecting the change-over signal indicating whether exposure control is to be carried out automatically or manually. In the case where the change-over mechanism for switching between automatic exposure control mode and manual exposure control mode is included in the stop ring of the photographing lens in the same manner as the prior art, an electrical contact corresponding to the contact. 181 can be provided in the photographing lens of the present invention, as shown by a broken line in FIG. 8.

Figure 9:
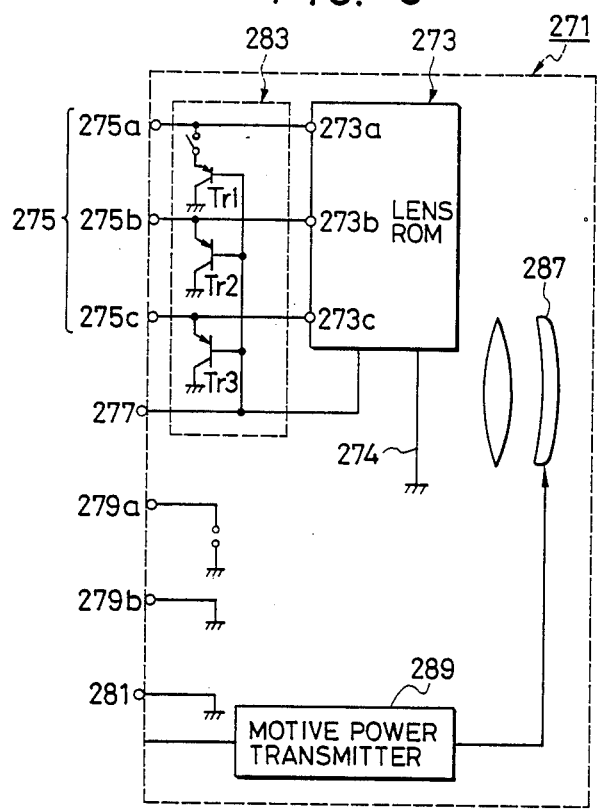
FIG. 9 is a schematic block diagram of a photographing lens constructed in accordance with a second embodiment of the invention.
Figure 10:
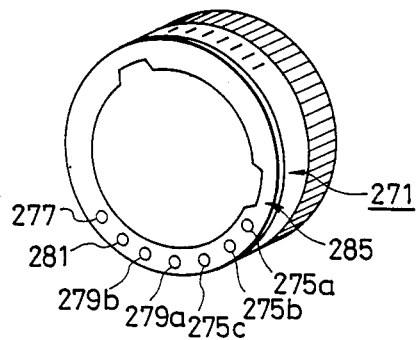
FIG. 10 shows a rear view of the lens of FIG. 9.

Another example of a photographing lens embodying the present invention will be now described. FIG. 9 is a schematic block diagram showing the internal construction of the second embodiment of the photographing lens according to the invention. FIG. 10 is a schematic perspective view showing an example of the second embodiment of a photographing lens according to the invention. In these drawings, reference numeral 271 designates a photographing lens according to the invention.

In FIG. 9, reference numeral 273 designates a lens ROM. The lens ROM 273 stores lens characteristic data for both AE and AF operations. Reference numeral 275 designates a group of electrical contacts respectively connected to different terminals of the lens ROM 273 and serving to transmit data between the lens ROM and the camera body. In this embodiment, the electrical contact group 275 is, for example, composed of three electrical contacts 275a, 275b and 275c. Reference numeral 277 designates a lens ROM control electrical contact. For example, the control electrical contact 277 is provided to supply a source voltage from the camera body to the lens ROM 273. When the source voltage is supplied from the contact 277, the lens ROM 273 is in operation. Reference numeral 274 designates a ground terminal. For example, the ground terminal 274 can be connected to the mount of the photographing lens.

Each of reference numerals 279a and 279b designates an electrical contact, for example, for transmitting a minimum lens-stop value to the camera body. In the embodiment shown in FIG. 9, a binary-coded digital signal, that is, a minimum lens-stop value expressed by "0" and "1", is transmitted to the camera body through the electrical contacts 279a and 279b. Reference numeral 281 designates an electrical contact for transmitting data for changing over control between automatic exposure control mode and manual exposure control mode.

Figure 2:
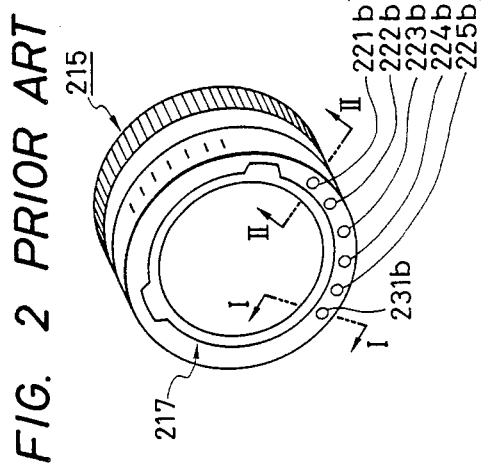
FIG. 2 is a rear view of a lens used with the camera body of FIG. 1.
Figure 5:
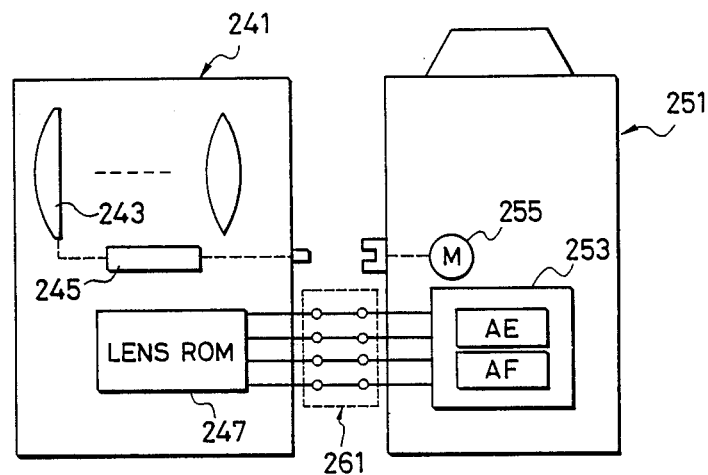
FIG. 5 is a schematic block diagram showing the lens of FIG. 2 coupled electrically to the camera body of FIG. 1.

The respective electrical contacts 275a, 275b, 275c, 279a, 279b and 281 and the control electrical contacts 277 are attached to the photographing lens as shown in FIG. 10. FIG. 10 is a perspective view showing the photographing lens according to the invention. In this embodiment, the respective contacts 275a, 275b, 275c, 279a, 279b and 281 are provided on the mount of the photographing lens 271 in the same arrangement and manner as described above for the contacts 221b, 222b, 223b, 224b, 225b and 231b in FIG. 2. In other words, the respective contacts 275a, 275b, 275c, 279a and 279b are electrically insulated from the mount 285 and are constructed so as to not project from the surface of the mount 285. The contact 281 is electrically insulated from the mount 285 and provided so as to be able to project from the mount 285. On the other hand, the contact 277 is electrically insulated from the mount 285 and provided at a predetermined position so as to able to project from the mount 285. The mount 285 functions as an electrical ground.

Reference numeral 283 designates a change-over circuit for controlling the functions of the electrical contact groups 273. In this embodiment, the change-over circuit is constructed as follows. The emitter of a PNP transistor Tr1 acting as an electronic switch is connected to the electrical contact 275a, the latter being connected to one data terminal 273a of the lens ROM 273. Similarly, the emitter of a PNP transistor Tr2 is connected to the electrical contact 275b, which is connected to another data terminal 273b, and the emitter of a PNP transistor Tr3 is connected to the electrical contact 275c connected to a further data terminal 273c. The base of each transistor is connected to the lens ROM control electrical contact 277 connected to the lens ROM 273. Further, the collectors of the transistors are either grounded or electrically open, which ones of the collectors are grounded being determined according to the type of the photographing lens. In the case shown in FIG. 9, the collector of the transistor Tr1 is left open and the collectors of the other transistors Tr2 and Tr3 are grounded. In this case, when the electrical potential of the control electrical contact 277 is substantially at ground potential, each of the transistors is in the ON state. If a voltage is supplied to each of the electrical contacts 275a, 275b and 275c through a pull-up resistor, the voltage state of the contact 275a is a high level while the contacts 275b and 275c are at a low level. Further, the photographing lens 271 of the invention has a lens system having a lens 287 movable for focusing, and a motive power transmitter 289 for transmitting motive power from the camera body to the lens 287.

The operations of the photographing lens and camera body of the second embodiment will be described with reference to the following two examples, of which the first relates to the case where the photographing lens of the invention is attached to an exclusive camera body having an AF mechanism, and the other relates to the case where the photographing lens is attached to a conventional camera body as described above with reference to FIG. 1.

EXAMPLE 1

The operations of the photographing lens and camera body will be described a to the former case where the photographing lens of the invention is attached to an exclusive camera body having an AF capability.

Figure 11A:
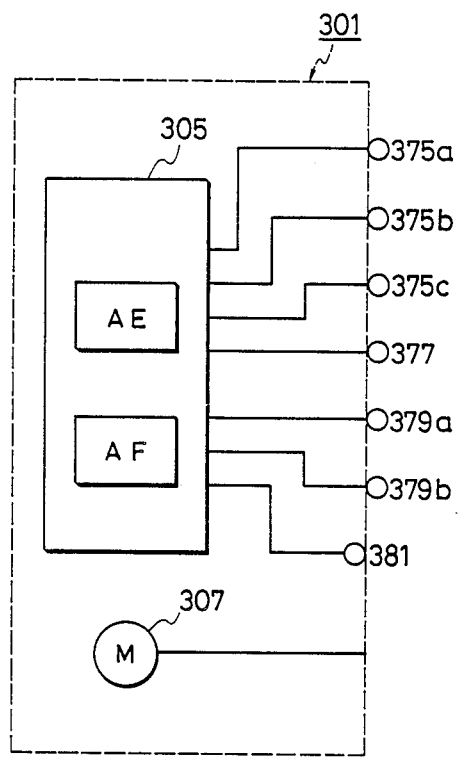
FIG. 11A is a schematic block diagram of a camera body having an AF capability and constructed in accordance with the present invention.
Figure 11B:
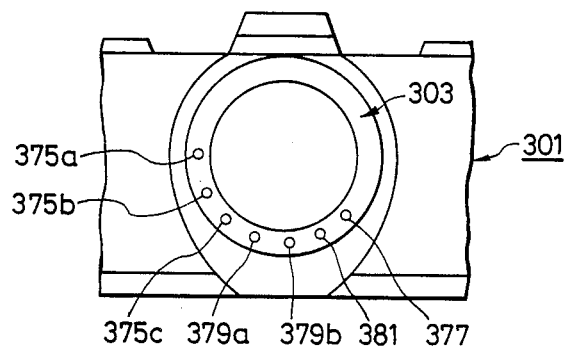
FIG. 11B is a front view of the camera of FIG. 11A.

FIG. 11A is a block diagram showing the internal construction of the AF body, and FIG. 11B is a schematic front view showing a main part of the AF body.

The AF body 301 has a mount 303 which includes electrical contacts 375a, 375b and 375c respectively corresponding to the electrical contacts 275a, 275b and 275c of the photographing lens, a control electrical contact 377 corresponding to the lens ROM control electrical contact 277, and electrical contacts 379a, 379b, and 381 corresponding to the electrical contacts 279a, 279b and 281 of the photographing lens. Further, the AF body 301 has a controller 305 for taking a photograph with AE and AF operations, and an actuating device 307 (motor) for actuating the movable focusing lens 287 of the photographing lens system.

FIG. 11B shows the condition in which the respective electrical contacts 375a, 375b, 375c, 377, 379a, 379b and 381 are attached to the AF body 301. That is, the contacts 375a, 375b, 375c, 379a and 375b are provided on the mount 303 of the AF body 301 in the same arrangement and manner as described above for the contacts 221a, 222a, 223a, 224a, 225a and 231b in FIG. 1. In short, the contacts 375a, 375b, 375c, 379a and 379b are electrically insulated from the mount 303 and provided so as to be able to project from the surface of the mount 303 (structure of FIG. 3). The contact 381 is electrically insulated from the mount 303 and does not project from the surface of the mount 303 (structure of FIG. 4). Further, the contact 377 is provided at a predetermined position on the mount 303 so as to be able to project from the mount 303, and it is electrically insulated from the mount 303. The mount 303 functions as an electric ground.

Figure 12:
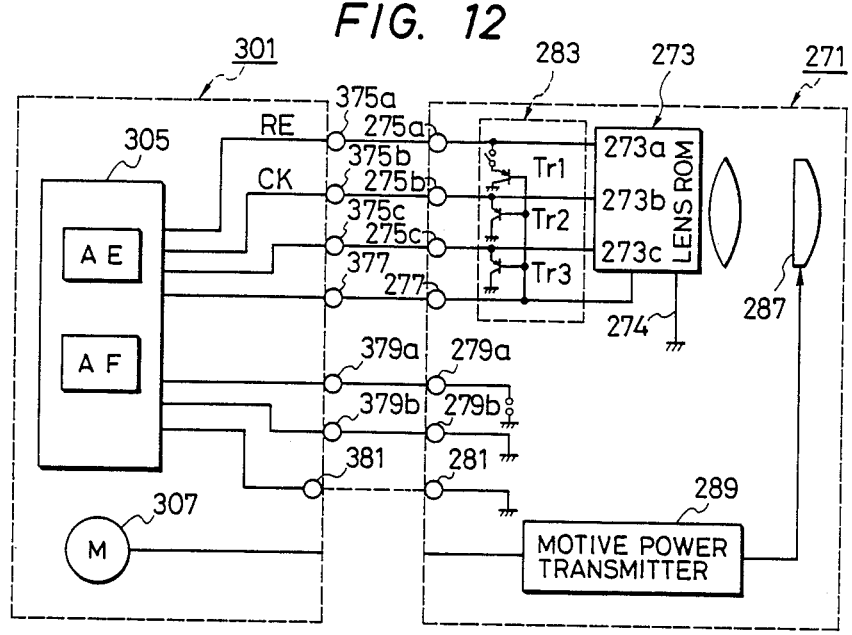
FIG. 12 is a block schematic diagram showing the lens of FIG. 9 coupled to a camera body in accordance with one example of usage of the invention.

FIG. 12 is a block diagram showing the photographing lens 271 of the invention attached to the aforementioned AF body 301.

In this embodiment, a voltage (for example, +5 V) for actuating the lens ROM, is supplied from the controller 305 of the AF body 301 to the lens ROM through the contact 377 and the lens ROM control contact 277 of the photographing lens 271. At the same time, the voltage is supplied to the base of each of the PNP transistors Tr1 to Tr3 of the change-over circuit 283. Accordingly, each of the transistors Tr1 to Tr3 is set to the OFF state while the lens ROM 273 is operated in the usual manner. Accordingly, the circuit between the contact 275a and the terminal 273a, the circuit between the contact 275b and the terminal 273b, and the circuit between the contact 275c and the terminal 273c are made operative so that data transmission between the controller 305 of the AF body 301 and the lens ROM 273 of the photographing lens 271 can be made.

For example, data transmission is carried out as follows. The reset signal (RE) from the controller 305 of the AF body is fed to the lens ROM 273 through the contacts 375a and 275a with a predetermined period. Further, the clock signal (CK) from the controller 305 of the AF body is applied to the lens ROM 273 through the contacts 375b and 275b. Accordingly, various kinds of data, such as the open lens-stop value data of the photographing lens 271, position data of the lens 285, and the like are serially transmitted from the lens ROM 273 to the controller 305 through the contacts 275c and 375c in response to the reset signal and clock signal. Further, the minimum lens-stop value data is transmitted through the pairs of contacts 379a and 279a, and 379b and 279b. The data for change-over between automatic exposure control mode and manual exposure control mode is discriminated by whether or not the contact 281 of the photographing lens is in touch with the contact 381 of the camera body.

According to the aforementioned construction, photographing in both AF and AE modes can be carried out.

EXAMPLE 2

The operations of the photographing lens and camera body will now be described as to the latter case where the photographing lens 271 of the invention is attached to a conventional camera body 211 as described with reference to FIG. 1.

Figure 13:
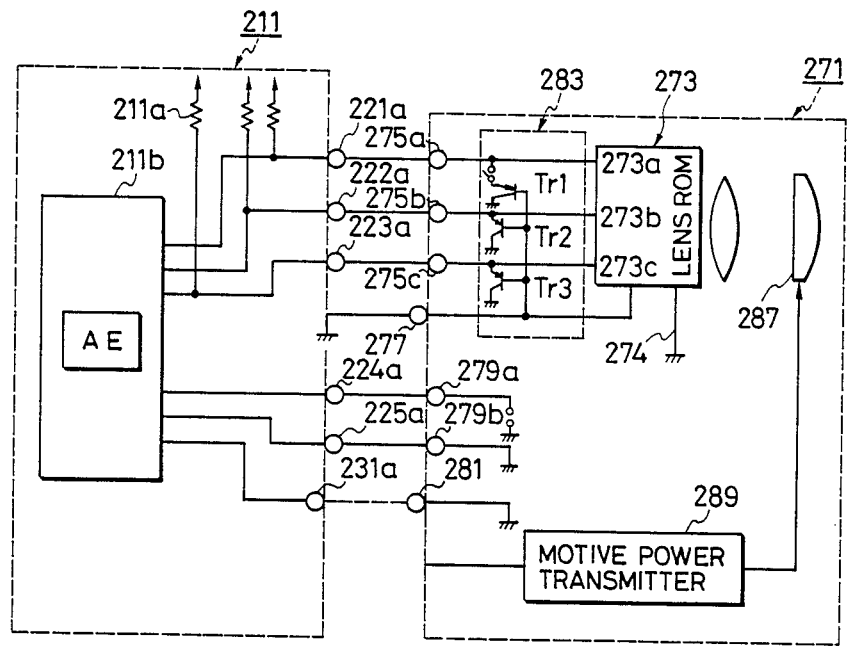
FIG. 13 is a block schematic diagram showing the lens of FIG. 9 coupled to a camera body in accordance with another example of usage of the invention.

FIG. 13 is a block diagram showing the typical state in which the photographing lens 271 of the invention is attached to the conventional camera body 211.

In this arrangement, the lens ROM control contact 277 of the photographing lens 271 touches the mount of the camera body 211 so that the contact 277 is grounded. Accordingly, the lens ROM 273 is set to the OFF state (not powered), whereupon the data terminals 273a, 273b and 273c of the lens ROM 273 are, in high-impedance states. The bases of the transistors Tr1 to Tr3 of the change-over circuit 283 are grounded so that the transistors Tr1 to Tr3 are in the ON state. As described above, the collectors of the transistors may be grounded or may be electrically open in order to establish a signal corresponding to the type of the photographing lens, for example, to establish a signal corresponding to the open lens-stop value data of the lens. Accordingly, with a voltage (for example, +5 V) applied to each of the transistors Tr1 to Tr3 through the pull-up resistors 211a provided on the camera body 211 and the electrical contacts 275a, 275b and 275c, the voltage of the electrical contacts 275b and 275c connected to the transistors having grounded collectors are at the low level. The voltage of the electrical contact 275a connected to the transistor having an open collector is the high level. Thus, a signal expressing the open lens-stop value data is transmitted to the camera body.

The minimum lens-stop value data is transmitted to the camera body through the pairs of contacts 224a and 279a, and 225a and 279b.

Further, the data for change-over between automatic exposure control mode and and manual exposure control mode is discriminated by whether or not the contact 281 touches the, contact 231a. These data are inputted to the controller 211b of the camera body 211.

According to the aforementioned arrangement, photographing using an AE operation can be carried out using a conventional camera body to which the inventive photographing lens having an AF capability.

The present invention is not limited to the aforementioned arrangements.

Although the aforementioned embodiment has been described with reference the case where the change-over circuit 283 is connected to the lens ROM 273 outside of the lens RCM 273, it is a matter of course that the change-over circuit may be incorporated in the lens ROM and that electronic switches, such as PNP transistors, forming constituent parts of the change-over circuit may be incorporated in a custom IC chip if the lens ROM is prepared as a custom IC.

Figure 14:
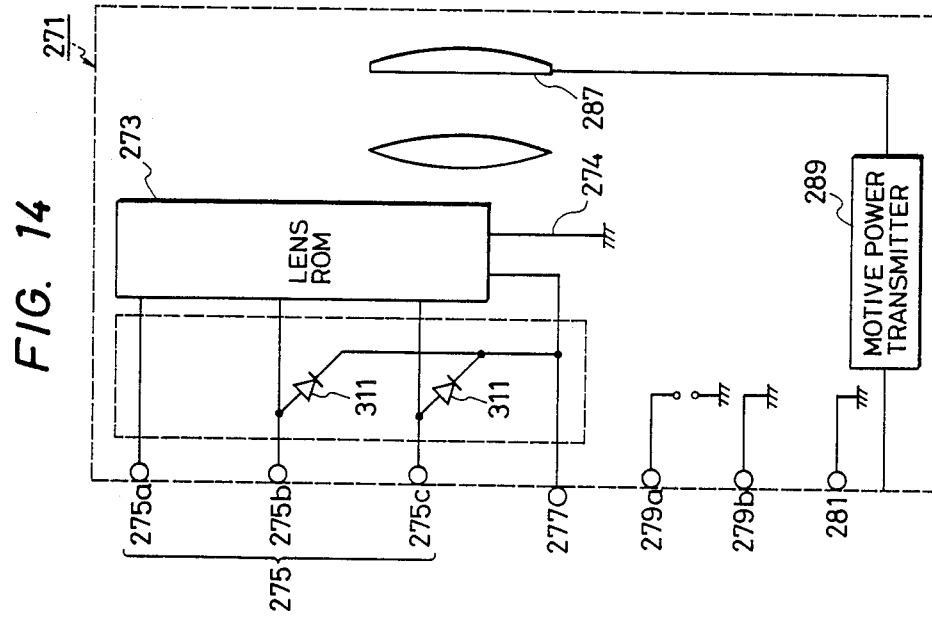
FIG. 14 shows a modification of the lens of FIG. 9.

Moreover, although the aforementioned embodiment has been described with respect to the case where the change-over circuit includes a plurality of PNP transistors, it is a matter of course that the change-over circuit may be composed of other parts. For example, the change-over circuit may be constructed as shown in FIG. 14, in which diodes 311 are connected to respective electrical contacts, whereby a low level signal is applied to each of the electrical, contacts when the lens ROM 273 is in the OFF state. In other words, each diode 311 is interposed between a respective electrical contact and the lens ROM control contact so that the control contact functions as a common cathode. With this arrangement, the same effects as in the aforementioned embodiment are obtained.

Although the aforementioned embodiment has been described with respect to the case where an electrical contact group switched by the change-over circuit 283 is composed of three electrical contacts, the number of the contacts constituting the electrical contact group can be set in accordance with the quantity of data to be transmitted.

Further, it is to be understood that the number of electrical contacts provided in the camera body and photographing lens can be varied as needed.

Moreover, although the aforementioned embodiment has been described with respect to the case where a single lens ROM control electrical contact is provided, it is to be understood that the invention is not limited to this specific embodiment and that a plurality of lens ROM control electrical contacts may be provided.

As apparent from the above description, the photographing lens of the present invention has a change-over circuit for changing the group of electrical contacts between one state where the contacts are exclusively used to transmit different data when the voltage on the lens ROM control electrical contact is set to power the lens ROM, and the other state where the contacts are used to transmit one datum as a whole when the voltage on the lens ROM control contact does not power the lens ROM.

Accordingly, when the photographing lens is attached to an exclusive camera body having an AF capability, a voltage for energizing the lens ROM is applied to the lens ROM control electrical contact so that photographing in both AF and AE modes can be carried out. On the other hand, when the photographing lens is attached to a conventional camera body, the lens ROM control electrical contact is grounded to stop the lens ROM from operating and to transmit only one datum, for example, the open lens-stop value, from the change-over circuit to the camera body through the electrical contact group, whereby photographing in the AE mode only can be effected.

Therefore, the invention provides a photographing lens having interchangeability such that it can be used with an exclusive camera body having an AF capability and also with a conventional camera body without losing the AE capability.

A further embodiment of the present invention will be described in detail with reference to the drawings.

Figure 15:
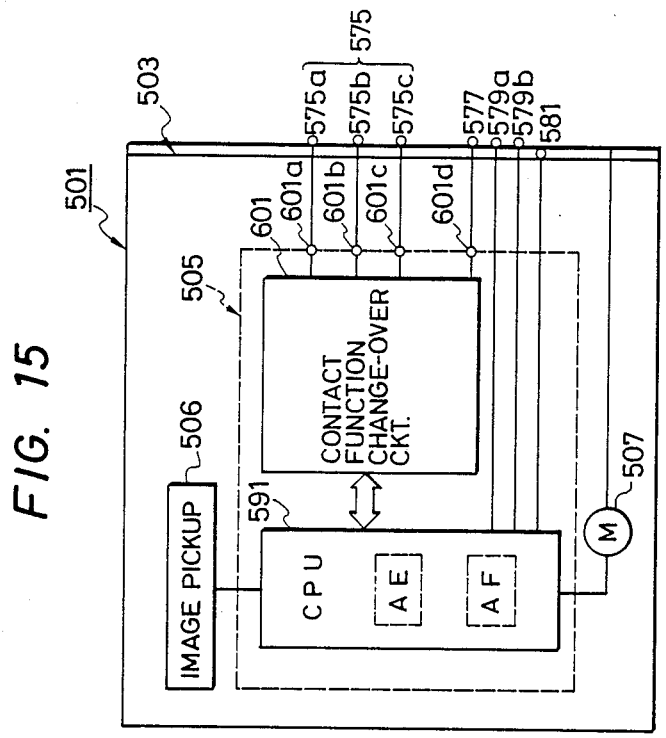
FIG. 15 is a block schematic diagram of a camera body constructed in accordance with a further embodiment of the invention.

An example of the construction of a camera body according to this embodiment of the present invention will be now described. FIG. 15 is a schematic block diagram showing the internal construction of a preferred embodiment of a camera body according to the invention.

In FIG. 15, reference numeral 501 designates a camera body, and reference numeral 503 designates a body-side mount to which a photographic lens can be mounted.

The camera body 501 is provided with a controller 505, an image pickup 506, and a lens driving motor 507. Other parts of the camera body will be described in detail later. Further, the mount 503 of the camera body 501 has an electrical contact group 575 composed of a plurality of electrical contacts, an electrical contact 577 for identifying the photographing lens, and electrical contacts 579a, 579b and 581.

In this embodiment, the controller 505 includes a microcomputer (CPU) 591, and a circuit 601 for changing over the function of the electrical contact group 575 as to data transmission between the CPU 591 and the photographing lens.

The image pickup 506, which is connected to the CPU 591, is provided to form an image of the subject from a portion of the light transmitted through the photographing lens (not shown). For example, the image pickup 506 may be implemented with a circuit containing a CCD (charge coupled device).

The lens driving motor 507 is connected to the CPU 591 to drive the automatic focusing movable lens provided in the photographing lens.

The primary functions of the controller 105 will now be described.

The CPU 591 in the controller 505 carries out AE control. Further, the CPU 591 performs automatic focusing AF control so that the movable lens in the photographing lens can be moved by the lens driving motor 507 in the camera body 501 corresponding to the information received from the image pickup portion 506.

The CPU 591 carries out other various types of control necessary for photographing.

In the case where the photographing lens mounted on the camera body 501 has an automatic focusing capability, the contact function change-over circuit 601 in the controller portion 505 changes over the contacts of the electrical contact group 575 as respective contacts transmit different data. On the other hand, in the case where the photographing lens has no automatic focusing capability, the circuit 601 changes over the contacts of the electrical contact group 575 to transmit one datum as a whole.

The contacts of the electrical contact group 575 are respectively connected to different data terminals of the CPU 591 through the aforementioned contact function change-over circuit 601. In this embodiment, the electrical contact group is composed of three contacts 575a, 575b and 575c, which are connected to outside terminals 601a, 601b and 601c, respectively, of the contact function change-over circuit 601.

As described above, the electrical contacts 575a, 575b and 575c function either as exclusive contacts for transmitting different data or as non-exclusive contacts for transmitting only one datum depending on whether or not the photographing lens mounted on the camera body 501 has an AF capability.

The identification electrical contact 577 is provided to indicate whether the photographing lens mounted on the camera body 501 has an automatic focusing capability or not. The identification electrical contact is connected to an outside terminal 601d of the change-over circuit 601.

The electrical contacts 579a and 579b are provided to transmit data, for example, the minimum lens-stop value data of the photographing lens, to the CPU 591 in the camera body. The electrical contact 581 is provided to indicate whether photographing should be carried out under automatic exposure control or whether it should be carried out under manual exposure control.

Figure 1:
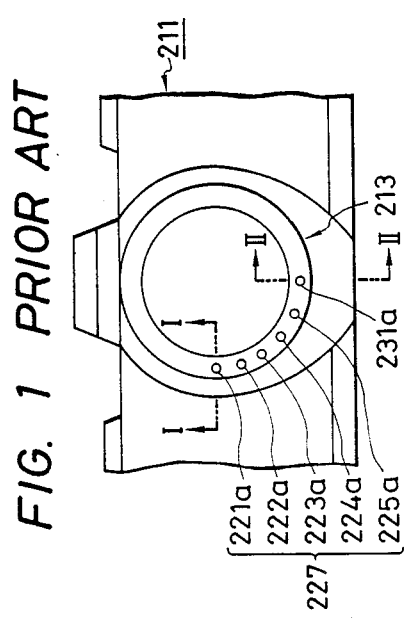
FIG. 1 is a front view of a prior art camera body having an AE capability.

In this embodiment, the respective contacts designated by reference numerals 575a, 575b, 575c, 579a, 579b and 581 are provided on the mount 503 of the camera body 501 in the same arrangement and manner as described above with respect to the contacts 221a, 222a, 223a, 224a, 225a and 231a in FIG. 1. In other words, the respective contacts 575a, 575b, 575c, 579a and 579b are electrically insulated from the mount 503 and are constructed so as to be able to project from the surface of the mount 503. Further, the contact 581 is electrically insulated from the mount 503 and arranged so as to not project from the mount 503. Further, the identification electrical contact 577 is provided at a predetermined position of the mount 503 so as to be able to project from the surface of the mount 503, and it is electrically insulated from the mount 503. The mount 503 functions as an electrical ground.

An example of the construction of the aforementioned contact function change-over circuit 601 will now be described with reference to FIG. 16A. FIG. 16A is a block diagram showing a contact function change-over circuit, but it is to be understood that the invention as to the contact function change-over circuit is not limited to this specific embodiment and the circuit may be constructed of other parts or implemented in software.

In this embodiment, the contact function change-over circuit 601 includes four selective switching circuits 610 of the same structure, which are connected to the electrical contacts 575a, 575b, 575c, and 577, respectively.

Each of the selective switching circuits 610 is composed of a first D-type flip-flop circuit (D-FF) 621 functioning as an input-output change-over latch, a second D-FF 623 functioning as an output latch, a first three-state buffer 625 functioning as an output buffer, a second three-state buffer 627 functioning as an input buffer, and a pull-up resistor 629. The relation of these constituent members and the relation of the selective switching circuits 610 and the electrical contacts or CPU will be described with reference to the electrical contact 575a as an example.

The Q-output terminal of the first D-FF 621 is connected to the control terminal of the first three-state buffer 625. The Q-output terminal of the first D-FF 621 is connected to the control terminal of the first three-state buffer 627. The Q-output terminal of the second D-FF 623 is connected to the input terminal of the first three-state buffer 625. The respective D-input terminals of the first and second D FFs are connected to predetermined I/O terminals of the CPU 591.

The output terminal of the first three-state buffer 625 is connected to the electrical contact 575a of the body mount 503 through the terminal 601a of the controller. The terminal 601a is also connected to the input terminal of the second three-state buffer 627. The output terminal of the second three-state buffer 627 is connected to a predetermined input of the CPU 591.

For example, the same voltage (VDo) as the power source voltage of the CPU 591 is applied to the outside terminal 601a through the pull-up resistor 629.

The other selective change-over circuits which relate to the electrical contacts 575b, 575c and 577 are connected between a corresponding electrical contact and the CPU in the same manner as described above for the electrical contact 575.

Corresponding to the voltage on the identification electrical contact 577, the change-over circuit 601 and the CPU 591 operate in the manner as follows. FIG. 16B is a flowchart showing the operation.

First, "0" is applied to the D-input terminal of the first D-FF 621 in each of the selective switching circuits 610 relating to the electrical contacts 575a, 575b, 575c and 577, so that the Q and Q outputs are set to "0" and "1", respectively. At this time, the output buffer 625 is in the OFF state and the input buffer 627 in the ON state so that the voltages at the electrical contacts 575a, 575b, 575c and 577 are applied to the CPU 591. When the CPU is in operation (Step 651), the signal (voltage state) on the electrical contact 577 is inputted to the CPU with a predetermined period (Step 252). The CPU 591 judges whether the signal $S_1$ on the electrical contact 577 is a "1" or "0" (Step 653).

In the case where $S_1$ is a "0", the CPU 591 judges that the photographing lens mounted on the camera body is of a conventional type. In this case, the group 575 of electrical contacts are switched so as to receive only the open lens-stop value data of the conventional photographing lens (Step 654). Thus, AE control is carried out as in the prior art.

On the contrary, in the case where $S_1$ is a "1", the CPU 591 judges that the photographing lens mounted on the camera body has an AF capability. In this case, "1" is applied to the D input terminal of the first D-FF 621 in each of the selective, switching circuits 610 relating to the electrical contacts 575a, 575b and 575c, so that Q and Q are set to "1" and "0", respectively. At this time, the output buffer 625 is placed in the ON state, and the input buffer 627 in the OFF state so that the respective electrical contacts 575a, 575b and 575c in the electrical contact group 575 function as exclusive contacts for transmitting different data. Accordingly, communication with the outside circuit can be carried out (Step 655).

The operation of the above-described camera body with an exclusive photographing lens having an AF capability of the type shown in FIG. 9 has already been discussed above with respect to FIG. 12. The operation of the inventive camera body with a conventional photographing lens mounted on the camera body of the invention will now be considered.

Figure 17:
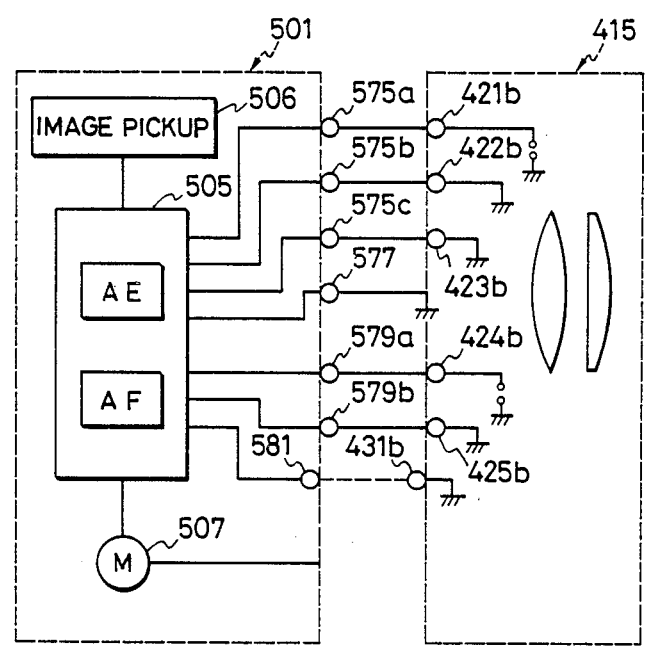
FIG. 17 is a diagram showing the use of a camera body of the invention with a conventional lens.

FIG. 17 is a block diagram showing a conventional photographing lens 415 attached to the camera body 501 of the invention.

In such an arrangement, an electrical contact corresponding to the identification electrical contact 577 of the camera body 501 is not provided on the conventional photographing lens 415, and hence the electrical contact 577 is directly in touch with the mount 417 of the conventional photographing lens 415. Accordingly, the contact 577 is grounded so, that the voltage at the contact 577 is at a low level. When the voltage at the contact 577 is at a low level, the CPU 591 is not operative under automatic-focusing photographing control. Further, when the voltage at the identification electrical contact 577 is at a low level, the change-over circuit 610 in the controller 505 operates to apply the voltages at each of the electrical contacts 575a, 575b and 575c to the controller 505.

On the other hand, the conventional photographing lens 415 is pretreated at each of the electrical contacts 421b, 422b and 423b so that some contacts are coated with an insulating material and some contacts are connected to the mount. Accordingly, when a source voltage of the CPU 591 is applied to the body-side contacts 575a, 575b and 575c, the voltages at the body-side contacts 575a, 575b and 575c are respectively determined corresponding to whether the contacts 421b, 422b and 423b are electrically insulated (open) or whether the contacts are grounded. Thus, the open lens-stop value data of the photographing lens is transmitted from the photographing lens to the controller 505 corresponding to the combination of the voltage states.

Further, the minimum lens-stop value is transmitted through the pairs of contacts 424b and 579a, and 425b and 579b. Also, the data for selecting between automatic exposure control mode and manual exposure control mode is set by whether or not the contact 431b is in touch with the contact 581. These data are applied to the controller 505 of the camera body 501.

According to the aforementioned construction, AE photographing operations can be carried out even in the case where the conventional photographing lens is mounted on the camera body of the invention having an AF capability.

As is apparent from the above description, the camera body of the present invention incorporates an identification electrical contact to automatically determine whether the camera lens mounted on the camera body has an automatic focusing capability or not. Further, necessary data transmission can be made through the electrical contact group in accordance with the type of the photographing lens, that is, whether or not the photographing lens has an automatic focusing capability.

Accordingly, when an exclusive photographing lens having an AF capability is mounted on the camera body, photographing in either the AF or AE mode can be performed. On the other hand, when a conventional photographing lens is mounted on the camera body, photographing in the AE made can be carried out in the same manner as in the prior art.

Therefore, the invention provides a camera body having interchangeability such that it can use both an exclusive photographing lens having an AF capability and a conventional photographing lens without sacrificing the AE capability.

What is claimed is:

1. A camera capable of being used with a plurality of types of interchangeable photographing lens means, comprising:
   a camera body having a first mount for mounting photographing lens means to said body;
   a first electrical contact;
   means coupled to said first electrical contact for detecting whether a photographing lens means mounted on said mount has an automatic focusing capability;
   a first group of electrical contacts for coupling signals between said photographing lens means and said camera body; and
   means for transmitting via said first group of electrical contacts a single datum from said photographing lens means to said camera body in a parallel mode when said detecting means detects that said lens has no automatic focusing capability and transmitting and receiving a plurality of different data in a series mode when said detecting means detects that said photographing lens means has an automatic focusing capability.

2. The camera of claim 1, wherein power for actuating a photographing lens means having an automatic focusing capability mounted on said first mount is supplied, via said first contact.

3. The camera of claim 1, wherein said first electrical contact and said first group of electrical contacts are provided on said first mount and at least said first electrical contact protrudes from a surface of said first mount.

4. The camera of claim 2, wherein said first electrical contact and said first group of electrical contacts are provided on said first mount and at least first electrical contact and protrudes from a surface of said first mount.

5. A camera capable of being used with a plurality of types of interchangeable photographing lens means, comprising:
   a camera body having a first mount for mounting photographing lens means to said body;
   a first electrical contact on said first mount;
   means coupled to said first electrical contact for detecting whether a photographing lens means mounted on said mount has an automatic focusing capability;
   a first group of electrical contacts on said first mount for coupling signals between said photographing lens means and said camera body;
   means for transmitting via said first group of electrical contacts a single datum from said photographing lens means to said camera body in a parallel mode when said detecting means detects that said lens has no automatic focusing capability and transmitting and receiving a plurality of different data in a series mode when said detecting means detects that said photographing lens means has an automatic focusing capability; and
   automatic photographing lens means comprising:
   a lens system freely movable for automatic focusing;
   memory means for storing characterizing data of said lens system;
   a second mount engageable with said first mount of said camera body;
   a second electrical contact for supplying power to said memory means, said second electrical contact being provided on said second mount at a position corresponding to that of said first contact; and
   a second group of electrical contacts provided on said second mount at positions corresponding to those of respective ones of said contacts of said first group of contacts, said contacts of said second group of contacts being connected to respective data terminals of said memory means.

6. The camera of claim 5, wherein said photographing lens means further comprises:
   means for providing a single lens characterizing datum for said lens system; and
   switching means coupled to said second group of contacts for selecting one of a first transmission mode and a second transmission mode in response to a voltage on said second electrical contact, whereby in said first transmission mode a plurality of different data from said memory means are transmitted through said second group of contacts to said first group of contacts in a series mode in response to a control signal from said body, and in said second transmission mode said datum provided by said means for providing said single lens characterizing datum is transmitted through said second group of contacts to said first group of contacts.

7. The camera of claim 6, wherein said characterizing datum is an open lens-stop value.

8. The camera of claim 5, wherein said second electrical contact projects from said surface of said second mount.

9. The camera of claim 6, wherein said second electrical contact projects, from said surface of said second mount.

10. The camera of claim 6, wherein said switching means comprises a plurality of electronic switches having control electrodes connected to said second terminal.

11. The camera of claim 10, wherein said electronic switches comprise transistors, said transistors having collector-emitter paths connected between respective ones of said terminals of said second group of terminals and one of a ground point and an open point in accordance with a bit pattern of said single datum.

12. The camera of claim 6, wherein said switching means comprises diode means.

13. The camera of claim 6, wherein said switching means is incorporated in said memory means.

14. A photographing lens comprising:
   a lens mount;
   a memory means;
   a plurality of electrical contacts provided on said lens mount and connected to respective data terminals of said memory means;

a control electrical contact provided on said mount, said control electrical contact being connected to an actuation terminal of said memory means;

means for providing a single lens-characterizing datum; and switching means for applying as determined by a voltage on said control electrical contact one of said single datum in a parallel mode and a series of data from said memory means to said plurality of electrical contacts.

15. The photographing lens of claim 14, wherein said control electrical contact projects from said mount.

16. The photographing lens of claim 14, wherein said switching means comprises a plurality of electronic switch means connected to respective ones of said plurality of electrical contacts and having control electrodes connected to said control electrical contact.

17. The photographing lens of claim 16, wherein said electronic switch means comprise transistors, said transistors having collector-emitter paths connected between respective ones of said plurality of electrical terminals and one of a ground point and an open point in accordance with a bit pattern of said single datum.

18. The photographing lens of claim 16, wherein said switching means comprises diode means.

19. The photographing lens of claim 16, wherein said switching means is incorporated in said read-only memory means.

20. The photographing lens of claim 14, wherein said single datum comprises an open lens-stop value.

21. The lens of claim 14, wherein said memory means is a read only memory.

22. The camera of claim 1 further comprising a third group of electrical contacts between said photographing lens means and said camera body, data representing a minimum lens-stop value being transmitted through said third group of electrical contacts to said camera body.

23. The camera of claim 1 further comprising a second electrical contact, data for changing over control between automatic exposure control mode and manual exposure control mode is transmitted through said second electrical contact.

* * * * *